Figure 1:
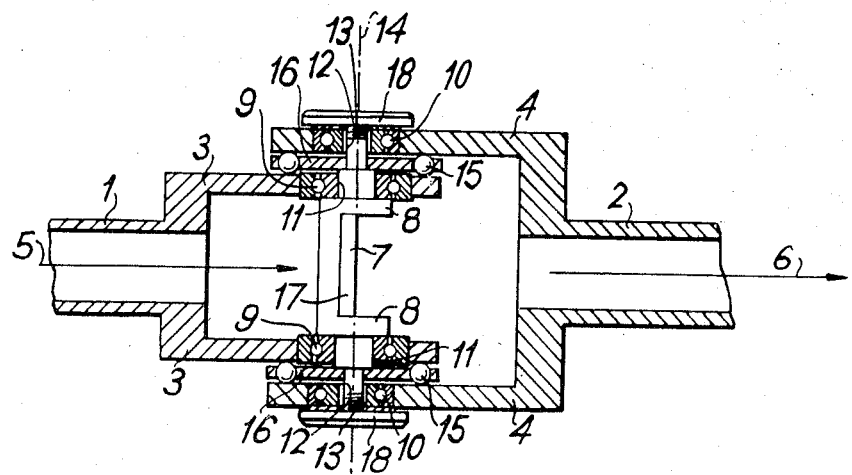

United States Patent

Beach

[15] 3,642,352
[45] Feb. 15, 1972

[54] PIVOTED MIRROR FOR ELBOW JOINT IN LIGHT TUBE

[72] Inventor: Allan David Beach, Newbury, England
[73] Assignee: National Research Development Corporation, London, England
[22] Filed: Dec. 9, 1969
[21] Appl. No.: 883,451

[30] Foreign Application Priority Data

Dec. 10, 1968 Great Britain ..................... 58,687/68

[52] U.S. Cl. ........................... 350/288, 128/303.1, 350/6
[51] Int. Cl. .......................................... G02b 5/08, A61b 17/36
[58] Field of Search ................... 350/23, 26, 80, 288, 299, 6; 128/303.1

[56] References Cited

UNITED STATES PATENTS

| 3,528,424 | 9/1970 | Ayres | 350/288 UX |
| 815,657 | 3/1906 | Swasey | 350/80 X |
| 3,420,594 | 1/1969 | Chapman | 350/6 X |

*Primary Examiner*—David Schonberg
*Assistant Examiner*—John W. Leonard
*Attorney*—Cushman, Darby & Cushman

[57] ABSTRACT

A mirror is mounted so that a light beam directed on to it with a given alignment relative to one of two relatively rotatable members is reflected with a fixed alignment relative to the other member as the two members are rotated. This requires half-rate relative rotation of the mirror, which is achieved by connecting it to balls or like rollable bodies arranged to roll in circular paths between surfaces on the two members. The device may be used in a laser beam manipulator, for example for surgery.

7 Claims, 3 Drawing Figures 3,642,352

PIVOTED MIRROR FOR ELBOW JOINT IN LIGHT TUBE

This invention relates to optical apparatus for reflecting light beams and is concerned with apparatus for varying the direction of a light beam by reflection through a variable reflective angle.

According to the invention an optical apparatus comprises two members arranged for rotation relative to each other about a given axis, at least one rollable body, and a mirror connected to the rollable body or bodies and having a planar reflective surface disposed with the given axis lying in the plane of the reflective surface, the or each rollable body being arranged in rolling contact with two surfaces respectively formed on the two members so that the body is constrained to roll, when the two members are rotated relative to each other, in a path such that a given point on the axis of rotation of the body moves along a circle centered on the given axis and lying in a plane perpendicular to the given axis equidistant from and between the positions at which the body respectively bears on the two surfaces, and the arrangement being such that when the two members are rotated relative to each other the rolling of the rollable body or bodies causes the mirror to rotate about the given axis with an angular velocity relative to one of the two members equal to one-half of the angular velocity of the other of the two members relative to said one of the two members.

In use of such an apparatus, a light beam directed onto the reflective surface of the mirror with a given alignment relative to one of the two relatively rotatable members will be reflected with a fixed alignment relative to the other of the two members as the two members are rotated relative to each other.

Figure 2A:
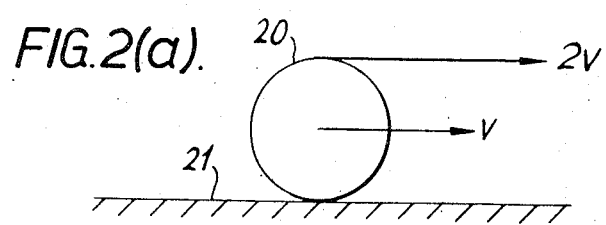
Figure 2B:
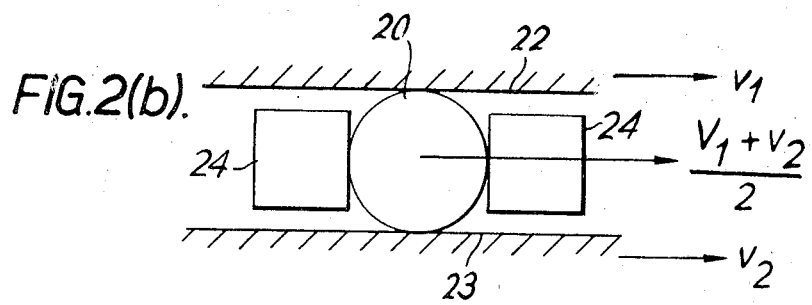

The invention will be further described and explained with reference to the accompanying drawings, in which:

FIG. 1 is a sectional view of one embodiment of apparatus according to the invention, and FIGS. 2(a) and 2(b) are explanatory diagrams.

Referring to FIG. 1 a first tube 1, through which an incident beam of light can be directed in the axial direction 5, is adapted for pivotal connection with a second tube 2 through which the reflected beam can be directed in the axial direction 6 after reflection at a planar reflective surface 7. The beam-exit end of the first tube 1 is pivotally connected to the beam-entry end of the second tube 2 by a spindle 8 extending transverse to the tubes 1 and 2, the pivotal connection being provided for by means of pairs of parallel flat flanges 3 and 4 respectively formed at the ends of the tubes 1 and 2. The axis 5 of the first tube 1 is coplanar with the axis 6 of the tube 2 for all pivotal positions of the tubes 1 and 2, the axes 5 and 6 intersecting the spindle axis 14 perpendicularly at a common point. The flanges 3 are fitted with ball races 9 fitting over spindle journals 14 and the flanges 4 are fitted with ball races 10 fitting over spindle journals 12, so that the tubes 1 and 2 are independently rotatable about the spindle 8. The ball races 10 are retained in position on the spindle 8 by caps 18.

Rotatable bodies are connected to the spindle 8 and roll in paths around the spindle axis 14 in order to rotate the spindle 8; these bodies consist of spherical balls 15 mounted in ball cages 16 secured on the spindle journals 12, each ball 15 being located between and contacting one of the flanges 3 and one of the flanges 4, the arrangement being such that relative rotation of the tubes 1 and 2 about the spindle 8 induces rotation of the spindle 8. As is explained below, the angular velocity of the rotation about the axis 14 of the spindle 8 relative to the tube 1 is equal to one-half of the angular velocity of the rotation about the axis 14 of the tube 2 relative to the tube 1.

A mirror 17 providing the reflective surface 7 is secured to the spindle 8 with the surface 7 coplanar with the axis 14. The reflective surface 7 is located so that an incident light beam directed along the axis 5 is reflected along the axis 6; it should be noted that in FIG. 1 the mirror 17 is shown rotated out of the correct alignment in order to illustrate the coincidence of the axis 14 with the surface 7. The correct alignment of the mirror 17 requires that the axes 5 and 6 should make equal angles with the reflective surface 7 and this is ensured during assembly of the apparatus by appropriate angular adjustment of the spindle 8 relative to the tubes 1 and 2; it will be noted that once the alignment is correctly set, the required relationship will be preserved despite rotation of the tubes 1 and 2 due to the angular velocity relationship referred to above.

The present invention is based upon the optical phenomenon that a beam having a fixed direction and incident at a planar reflecting surface rotatable about an axis lying in the plane of the reflecting surface, perpendicular to the plane of incidence and passing through the point of incidence, forms a reflected beam which rotates about the incident point with rotation of the mirror, the rate of rotation of the reflected beam being twice the rate of rotation of the reflecting surface.

To impart half rate angular rotation to the reflecting surface 7 relative to the rate of angular rotation of the tube 2 with respect to tube 1 the present invention exploits the relative velocities of a point on the axis of rotation and a point on the periphery of a rolling body. For example, for a sphere 20 rolling on a static flat surface 21, as illustrated in FIG. 2(a), if the center of the sphere 20 moves with an instantaneous velocity V, the instantaneous velocity of the point of the sphere diametrically opposite the point of contact with the surface 21 will be 2V. It follows that where a sphere 20 is in rolling contact with two parallel planar surfaces 22 and 23, as illustrated in FIG. 2(b), and the surfaces 22 and 23 move in the same direction parallel to the planes of the surfaces 22 and 23 with velocities $V_1$ and $V_2$ respectively, the center of the sphere 20 will move in the same direction with a velocity equal to $(V_1+V_2)/2$. Thus a cage 24 within which the sphere 20 is located will also move in the same direction with the same velocity as the center of the sphere 20, that is, the velocity of the cage 24 relative to the surface 23 will be one-half of the velocity of the surface 22 relative to the surface 23.

It will be appreciated that a similar analysis to that given above can readily be applied to other forms of rollable body, such as a cylinder. Further, although in the embodiment shown in FIG. 1 the surfaces with which each ball 15 is in contact are planar, other forms of surface could be used subject to the condition that the surface is in the form of at least part of a surface of revolution about the axis 14.

One application of an apparatus in accordance with the invention is as a flexible joint in a device for manipulating a laser light beam, for example for use in surgery. In such an application, the apparatus illustrated in FIG. 1 may be used as part of a compound joint giving two degrees of freedom by coupling the end of the tube 1 remote from the flange 3 to a further tube (not shown) coaxial with the tube 1 by means of a bearing permitting relative rotation of the tube 1 and the further tube about their common axis. A complete manipulating device may incorporate three such compound joints giving a total of six degrees of freedom. It should be noted that when the apparatus shown in FIG. 1 is used in such a manipulating device, the counterbalancing required is likely to impose relatively large loads on the joint between the tubes 1 and 2, and the design of the apparatus shown in FIG. 1 is such that these will not give rise to any substantial frictional forces. Thus, any side thrusts between the tubes 1 and 2 are transmitted by the ball bearings 9 and 10, while any forces parallel to axis 14 are transmitted by the balls 15 while the spindle 8, cages 16 and mirror 17 "float" axially in the angular position defined by the balls 15.

I claim:

1. An optical apparatus comprising:

two members mounted for rotation relative to each other about a given axis, said two members respectively having formed on them two surfaces which face each other and which are each in the form of at least part of a surface of revolution about said given axis;

at least one rollable body arranged in rolling contact with said two surfaces and constrained to roll, when said two members are rotated relative to each other, in a path such that a given point on the axis of rotation of the body moves along a circle centered on said given axis and lying in a plane perpendicular to said given axis equidistant from and between the positions at which the body respectively bears on said two surfaces;

a mirror having a planar reflective surface disposed with said given axis lying in the plane of the reflective surface;

and means connecting the mirror to said at least one rollable body so that the mirror is rotated about said given axis synchronously with the motion of said given point.

2. An optical apparatus according to claim 1, in which said rollable body is a sphere.

3. An optical apparatus according to claim 2, in which said two surfaces are planar surfaces disposed perpendicular to said given axis and spaced apart by a distance equal to the diameter of the sphere.

4. An optical apparatus according to claim 1, further comprising a spindle, rotatable about said given axis, on which the mirror is mounted and on which said two members are independently journaled.

5. An optical apparatus according to claim 4, in which the means connecting the mirror to said at least one rollable body comprises a cage mounted on the spindle and arranged to constrain said at least one rollable body.

6. An optical apparatus according to claim 1, in which said two members respectively comprise two tubes respectively having longitudinal axes which are disposed to intersect said given axis perpendicularly at a common point on said reflective surface and to make equal angles with said reflective surface.

7. An optical apparatus comprising:

two members mounted for rotation relative to each other about a given axis and having formed on them a plurality of pairs of surfaces, the surfaces of each pair facing each other and being respectively formed on said two members, the different pairs of surfaces being spaced apart along the length of said given axis and each of the surfaces being in the form of at least part of a surface of revolution about said given axis;

a plurality of sets of rollable bodies corresponding to said plurality of pairs of surfaces, each body of each set being arranged in rolling contact with the pair of surfaces corresponding to the set and constrained to roll, when said two members are rotated relative to each other, in a path such that a given point on the axis of rotation of the body moves along a circle centered on said given axis and lying in a plane perpendicular to said given axis equidistant from and between the positions at which the body respectively bears on the relevant pair of surfaces;

a mirror having a planar reflective surface disposed with said given axis lying in the plane of the reflective surface; and means connecting the mirror to said rollable bodies so that the mirror is rotated about said given axis synchronously with the motion of said given point for each of the rollable bodies.

* * * * *